Aug. 27, 1963  E. C. SCHESSER  3,101,580
MOWER SAFETY GUARD
Original Filed June 4, 1957
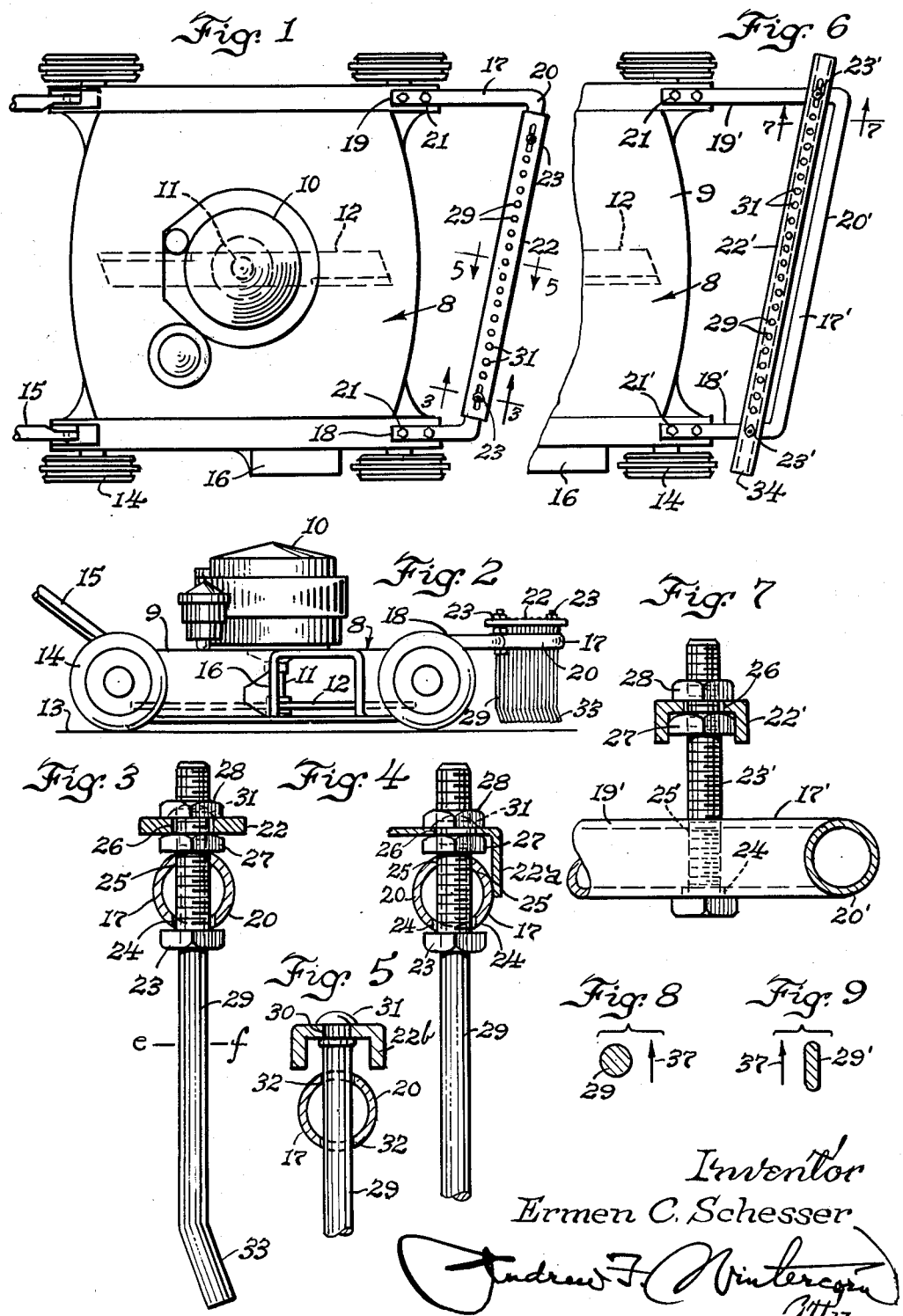
Inventor
Ermen C. Schesser

United States Patent Office 3,101,580
Patented Aug. 27, 1963

3,101,580
MOWER SAFETY GUARD
Ermen C. Schesser, 2701 Gregory St., Madison, Wis.
Original application June 4, 1957, Ser. No. 663,497, now Patent No. 2,982,079, dated May 2, 1961. Divided and this application July 1, 1960, Ser. No. 40,225
13 Claims. (Cl. 56—25.4)

This application is a division of my copending application, Serial No. 663,497, filed June 4, 1957, now Patent No. 2,982,079 issued May 2, 1961.

This invention relates to mower safety guards.

The so-called "rotary" power mowers which have their cutter bar operating in a horizontal plane under the housing have been very popular, but it is generally pretty well recognized that they are dangerous when operated in the conventional way, which is virtually without any guard. A stone, bone, piece of iron, or other debris left on a lawn can cause serious damage to the mower by contact with the cutter bar turning at a high speed, and there is also the danger that the operator or a bystander is apt to suffer serious injury when such debris is thrown by the cutter bar, and while some manufacturers of mowers have gone so far as to design the mower housings to provide a little better enclosure of the cutter bar for some protection of the operator, that is about as far as I believe safety precautions have been carried. It is, therefore, the principal object of my invention to provide a guard rake on the front of such a mower, which, if not provided as a part of the original equipment, may be easily applied as an attachment to existing machines, either by the owner himself or by a service man, and which, when properly applied and properly adjusted, will function as a bumper to prevent serious injury if a child gets in the way of the mower, the guard rake being rigid enough to serve as a dependable guard and preventing even a fallen child from getting run over and coming in contact with the cutter bar, the guard rake functioning incidentally also to pick up such things as sticks, stones, bones, toys and other debris, and push them to that side toward which the mowed grass is thrown.

I provide the frame of the guard of light construction, and provide the rake teeth of spring wire, so that the total weight of the attachment is kept low and the mower is not too heavily encumbered to interfere with easy all around operation, the rake teeth being furthermore narrow enough in the plane of raking not to offer too much resistance to forward movement through the grass, especially when the grass is high, so that there is not too much difficulty in pushing the mower along. The flattening of the teeth in the plane of raking makes for increased strength and rigidity in this direction also, which is so important for a guard. The guard rake teeth are preferably mounted on a bar that is adjustable vertically relative to the mower to obtain the right raking operation without too much drag on the mower, the guard frame in one form being U-shaped and having its transverse front portion disposed in forwardly spaced relation to the bar carrying the rake teeth, so as to serve as a bumper protecting the bar from possible damage by violent contact with trees and other obstructions, while the end portions of the bar projecting in front of the wheels serve as fenders therefor. In another form, the bar carrying the rake teeth is adjustably mounted at its opposite ends on arms fastened to the mower housing, no separate U-frame being provided.

The invention is illustrated in the accompanying drawing, in which—

FIGS. 1 and 2 are a plan view and side view, respectively, of a rotary power mower having a safety guard applied thereto made in accordance with my invention;

FIG. 3 is an enlarged section on the line 3—3 of FIG. 1;

FIG. 4 is a similar enlarged section showing a thinner bar that is of right angle or L-shaped cross-section for rigidity;

FIG. 5 is another enlarged section showing a bar of channel cross-section and illustrating how the guard rake teeth have their upper extremities swedged to the bar while said teeth are arranged to extend through guide holes in the guard frame, similarly as in FIGS. 3 and 4, this section being equivalent to one taken on line 5—5 of FIG. 1;

FIG. 6 is a view similar to FIG. 1 showing a modified or alternative construction;

FIG. 7 is an enlarged section on the line 7—7 of FIG. 6, and

FIGS. 8 and 9 show enlarged sections of different rake teeth.

Similar reference numerals are applied to corresponding parts throughout the views.

Referring first to FIGS. 1 to 3, the reference numeral 8 designates a rotary power mower comprising a generally rectangular housing 9 carrying an engine 10 on top thereof, whose driven shaft 11 is vertically disposed and drives a cutter bar 12 operating under the housing in a horizontal plane at a predetermined elevation with respect to the ground 13 on which the rollers 14 supporting the housing rest. The usual handle 15 is pivotally connected to and extends upwardly from the rear of the housing 9 and the mowed grass is discharged to the right of the machine through the usual discharge neck 16.

In accordance with my invention, a generally U-shaped tubular frame 17 has one arm 18 appreciably shorter than the other arm 19 so as to support the cross-portion 20 of the frame with the left hand end appreciably forward with respect to the right hand end when the arms 18 and 19 are secured as by means of bolts 21 to the top of the housing 9 at opposite sides of the front portion thereof, as shown in FIG. 1. A bar 22 above the frame 17 extends nearly the full length of the cross-portion 20 and is adjustably secured to it at its opposite ends by means of bolts 23, which extend freely through holes 24 in the cross-portion 20 but thread in registering holes 25 in said cross-portion and extend freely through holes 26 in the ends of the bar 22. Nuts 27 and 28 threaded on the bolts 23 below and above the bar 22 serve to support the bar at the desired elevation with respect to the frame 17 above the same. Now, of course, the bar 22 may be flat, as shown, or have an angular or L-shaped section like that shown at 22a in FIG. 4, or it may have a channel section, like that shown at 22b in FIG. 5, but in either case the same adjustment is provided, as shown in FIG. 4, and in either case the spring wire guard rake teeth 29, which are mounted in evenly spaced holes 30 in the bar and are secured in place by swedging the extremities, as shown at 31 in FIG. 5, extend through diametrically opposed guide holes 32 provided in the cross-portion 20 of the frame 17 in registering relation with the holes 30 in the bar, so that the cross-portion 20 of the frame 17 serves also as a perforated guide member below and in parallel relation to the bar 22b. The "spring wire" of teeth 29 is fairly sturdy and rigid, as seen in FIG. 3, in order that these teeth will not yield too readily and thereby fail to serve the guard function, the spring therein serving mainly to insure their return to normal position (instead of bending) if they are ever deflected to any appreciable extent by contact with a sizeable obstacle, like a fallen child. The lower end portions of the guard rake teeth 29 are bent forwardly as indicated at 33, to help in picking up sticks, stones, bones, and other debris as the guard teeth rake through the grass in the forward motion of the mower. As indicated in FIG. 2, the bar 22 is adjusted so that the lower ends 33 of the rake teeth 29 are all in closely spaced relation to the ground, much closer than the cutter bar 12, to be certain of picking up any object that might otherwise be apt to come into contact with the cutter bar, without imposing unnecessary drag on the movement of the mower and with minimum wear and tear on the rake.

The construction shown in FIGS. 6 and 7 is similar, but the frame 17' has longer arms 18' and 19' so that the cross-portion 20', while disposed at the same acute angle relative to the front of the housing 9 as the cross-portion 20 of frame 17, is in forwardly spaced parallel relation to the channel bar 22' carrying the guard rake teeth 29 swedged to the bar in the same manner as shown in FIG. 5. With this arrangement, the bolts 23' are secured in holes in the arms 18' and 19', and the end portions 34 of the bar 22' extend beyond the arms 18' and 19' and serve as fenders or bumpers in front of the wheels 14, while the cross-portion 20' of the frame 17' serves as a protecting bumper for bar 22'. The guard rake teeth 29 in this case, of course, do not extend through guide holes in the frame 17'.

In operation, both safety guards shown in FIGS. 1 and 6 afford the same mower safety guard advantages, in general. The sticks, stones, bones, toys, and other debris picked up by the guard rake teeth 29 are moved to the right by reason of the acute angular relationship of the guard with respect to the forward motion of the mower, the debris being deposited on the same side as the mowed grass is thrown, so that the same debris will not have to be picked up repeatedly. If the guard rake teeth 29 are provided of sufficient length so that the carrier bar 22 or 22' can be mounted at a given elevation above the frame 17 or 17' at the outset, as shown in FIG. 7, the bar may be adjusted downwardly from time to time as the rake teeth show evidence of wearing off on the lower ends, and in that way the same close spacing of the guard rake teeth with respect to the ground may be maintained for a long time by periodic adjustment. With the constructions shown in FIGS. 4, 5 and 7, the hexagonal nuts 27, the adjustment of which determines the elevation of the bar, are held against turning by contact of flat sides thereof with the flanges on the angular or channel section of the bar, these nuts being adjusted before the bar is dropped down in place on the nuts, after which the nuts 28 are threaded in place and tightened to lock the parts in adjusted position, without likelihood of the nuts loosening due to vibration. The lightness of the guard attachment and the fact that the guard rake teeth are fine enough to rake easily through the grass makes the guard attachment practical by virtue of the fact that the mower is not too heavily encumbered to be easily maneuverable and there is not too much resistance offered to the forward movement through the grass, even when it is deep, to make it too difficult for the operator to push the mower. The present guard may be easily applied to existing mowers when not provided as a part of the original equipment.

In FIG. 8 I have indicated a substantially circular section of one of the guard rake teeth 29, taken on the line *ef* of FIG. 3, the arrow 37 at the right indicating the direction of forward travel of the rake. In FIG. 9, I have indicated a rake tooth 29' of flattened substantially rectangular cross-section, elongated in the direction 37 of forward travel, with the thought that the teeth 29 may be flattened to this section below the plane of the line *ef* in FIG. 3, with a view to greater strength and rigidity through the major portion of the length of the tooth in the plane in which the tooth, especially in its function as a safety guard, must assume most of the stresses and strains, the flattened section serving to reinforce the tooth to resist deformation and at the same time reduce drag on the forward movement of the mower through the grass, especially where the grass is fairly high, so that the mower can be moved more easily. With teeth flattened in this way, the spacing of the teeth between centers may be decreased and hence more teeth can be mounted on a given length bar for improved safety guard action and, at the same time, better raking action, without too much increase in the resistance to forward movement of the mower.

It is believed the foregoing description conveys a good understanding of the objects and advantages of my invention. The appended claims have been drawn to cover all legitimate modifications and adaptations.

I claim:

1. A guard on the front of a mowing machine for use during mowing, said machine having a housing mounted on ground engaging wheels, and a motor on the housing driving a cutter blade operating in a horizontal plane under the housing, the housing having a lateral discharge opening on one side thereof, said guard comprising a generally U-shaped frame disposed in front of and rigid with said housing in a horizontal plane having a short arm and a relatively long arm extending rearwardly and secured to said housing, and a longer transverse portion disposed at an acute angle with respect to the front of said housing inclined toward that side thereof with the discharge opening, a pair of vertical bolts mounted in parallel spaced relationship on opposite sides of the U-frame and extending upwardly therefrom, a horizontal bar disposed over said U-frame in parallel relationship to the transverse portion thereof having holes provided in the opposite ends thereof through which said bolts extend, nuts threading on the bolts above and below the bar for adjusting the same vertically relative to said frame, and rake teeth carried on said bar and adjustable vertically therewith and extending downwardly approximately to ground level and spaced apart substantially equal distances laterally of the transverse portion of said frame, the rake teeth by virtue of the acute angle disposition of the bar with respect to the front of the housing serving to discharge material raked thereby toward that side of said housing with the discharge opening.

2. A guard structure as set forth in claim 1, wherein said rake teeth are of spring wire construction but fairly rigid and flexible with respect to said bar only under fairly heavy lateral pressure.

3. A guard structure as set forth in claim 1, wherein said bar is secured to said arms and disposed behind the transverse portion of said frame, so that the latter is adapted to serve as a bumper protecting said bar against damage in the event of forcible contact with a tree or other obstruction.

4. A guard structure as set forth in claim 1, wherein said bar is secured to said arms and disposed behind the transverse portion of said frame, so that the latter is adapted to serve as a bumper protecting said bar against damage in the event of forcible contact with a tree or other obstruction, the end portions of said bar projecting beyond said arms in front of adjacent wheels to serve as fenders therefor.

5. A guard structure as set forth in claim 1, wherein the transverse portion of said frame has holes provided therein spaced apart like the rake teeth, the rake teeth having portions intermediate the ends thereof extending through and slidable in said holes for additional support of the rake teeth independently of the bar.

6. A guard on the front of a mowing machine, comprising an elongated horizontal bar mounted for vertical adjustment on and relative to the machine, and spring wire rake teeth secured to said bar and extending downwardly therefrom approximately to ground level and spaced apart substantially equal distances laterally of the machine, a relatively fixed perforated guide member below and in parallel relation to said bar, said rake teeth having portions intermediate their ends slidably engaged in the perforations thereof for support and increased rigidity and strength, a pair of vertical bolts mounted in parallel spaced relationship on opposite ends of the guide member and extending upwardly therefrom, said bar having holes provided therein in the opposite ends thereof through which said bolts extend, and nuts threading on the bolts above and below the bar for adjusting said bar vertically relative to said guide member.

7. A guard on the front of a mowing machine, comprising an elongated horizontal bar, and spring wire rake teeth secured to said bar and extending downwardly therefrom approximately to ground level and spaced apart substantially equal distances laterally of the machine, and a perforated guide member below and in parallel relation to said bar, said rake teeth having portions intermediate their ends slidably engaged in the perforations thereof for support and increased rigidity and strength, said bar being adjustable up and down relative to said guide member, the rake teeth in such adjustment shifting endwise in said perforations, a pair of vertical bolts mounted in parallel spaced relationship on opposite ends of the guide member and extending upwardly therefrom, said bar having holes provided therein in the opposite ends thereof through which said bolts extend, and nuts threading on the bolts above and below the bar for adjusting said bar vertically relative to said guide member said rake teeth being of circular cross-section, each of said rake teeth being flattened in section below the level of said guide member for a large portion of the length thereof in a fore and aft plane approximately parallel to the direction of movement of the machine in mowing for increased strength and rigidity in that direction.

8. A guard on the front of a mowing machine for use during mowing, said machine having a housing mounted on ground engaging wheels, said guard comprising a generally U-shaped frame disposed in front of said housing in a horizontal plane having the arms thereof extending rearwardly from the transverse portion thereof and secured to said housing, a bar disposed substantially parallel to the transverse portion of said frame and having means rigidly securing the same at its opposite ends to said frame, the transverse portion of said frame having vertical perforations provided therein in laterally equally spaced parallel relationship relative to the front of said machine, and spring wire rake teeth secured to said bar and extending downwardly therefrom approximately to ground level and spaced apart laterally of the machine like said perforations, said rake teeth having portions intermediate their ends slidably engaged in said perforations for support and increased rigidity and strength, said bar being vertically adjustable relative to the transverse portion of said frame, and said rake teeth in such adjustment shifting endwise in said perforations, a pair of vertical bolts mounted in parallel spaced relationship on opposite sides of the U-frame and extending upwardly therefrom, said bar having holes provided therein in the opposite ends thereof through which said bolts extend, and nuts threading on the bolts above and below the bar for adjusting the same vertically relative to said frame.

9. A guard as set forth in claim 8, wherein said rake teeth are of circular cross-section, each of said rake teeth being flattened in section below the level of the transverse portion of said frame for a large portion of the length thereof in a fore and aft plane approximately parallel to the direction of movement of the machine in mowing for increased strength and rigidity in that direction.

10. A guard on the front of a mowing machine for use during mowing, said machine having a housing mounted on ground engaging wheels, said guard comprising a generally U-shaped frame disposed in front of said housing in a horizontal plane having the arms thereof extending rearwardly from the transverse portion thereof and secured to said housing, a bar disposed substantially parallel to the transverse portion of said frame and having means rigidly securing the same at its opposite ends to said frame, rake teeth secured to said bar and extending downwardly therefrom approximately to ground level and spaced apart substantially equal distances laterally of the machine, said bar having a longitudinally extending flange for reinforcement thereof, and said means rigidly securing the same at its opposite ends to said frame comprising vertical bolts extending upwardly from said frame freely through holes provided in said bar, and a pair of nuts threaded on each of said bolts one above and one below said bar, one of said nuts being held by said flange against turning.

11. A guard structure as set forth in claim 10 wherein each of said bolts is threadedly adjustable vertically in holes provided in said frame.

12. A guard structure as set forth in claim 10, wherein said bar is secured to said arms and disposed behind the transverse portion of said frame, so that the latter is adapted to serve as a bumper protecting said bar against damage by contact with a tree or other obstruction.

13. A guard structure as set forth in claim 10, wherein said bar is secured to said arms and disposed behind the transverse portion of said frame, so that the latter is adapted to serve as a bumper protecting said bar against damage by contact with a tree or other obstruction, the end portions of said bar projecting beyond said arms in front of adjacent wheels to serve as fenders therefor.

References Cited in the file of this patent
UNITED STATES PATENTS

| | | |
|---|---|---|
| 2,476,526 | Badlat | July 19, 1949 |
| 2,559,897 | Phelps | July 10, 1951 |
| 2,794,309 | Tabac | June 4, 1957 |